United States Patent [19]

Squires et al.

[11] 3,926,593

[45] Dec. 16, 1975

[54] PRECOATING PANEL BED FOR FILTERING AEROSOL OF MICRON-SIZE PARTICULATES

[75] Inventors: Arthur M. Squires, New York; Kun-Chieh Lee, Bronx, both of N.Y.

[73] Assignee: Arthur M. Squires, New York, N.Y.

[22] Filed: Sept. 19, 1974

[21] Appl. No.: 507,403

[52] U.S. Cl. ............................ 55/96; 55/98; 55/262; 55/282; 55/479; 55/512
[51] Int. Cl.² .................................. B01D 46/04
[58] Field of Search ........... 55/96, 98, 97, 282, 302, 55/474, 479, 262, 512; 210/275

[56] References Cited
UNITED STATES PATENTS

| | | | |
|---|---|---|---|
| 3,092,478 | 6/1963 | Smith | 55/262 |
| 3,296,775 | 1/1967 | Squires | 55/98 |
| 3,800,508 | 4/1974 | Zenz | 55/96 |

*Primary Examiner*—Bernard Nozick
*Attorney, Agent, or Firm*—Abraham A. Saffitz

[57] ABSTRACT

A panel bed fitted for puffback cleaning is arranged so that a precoat surface layer deposit of a fine granular or fibrous medium, of particle size finer than the granular material charged to the panel bed, can be put down at each gas entry face of the panel bed. The modified panel bed is useful for removing micron-size particulate matter from a gas, such as particles smaller than about 10 microns. It is especially useful in removing fume from products of combustion or partial combustion of a heavy residual fuel oil and for filtering radioactive or pathogenic or carcinogenic matter of about 2 microns and smaller in size. It is useful where the so-called absolute filter fabricated from paper cannot serve, for example, where the gas to be cleaned has a high humidity or where the particles are chemically reactive toward paper. At least part of the precoat deposit is put down from a gas entering the gas entry face at a velocity above 16 feet per minute, to provide a tough deposit with deep roots in the granular material of the panel bed and resistant to damage from vibrations or hard knocks or sudden change in gas flow. A later part of the deposit is preferably put down at a velocity below 16 feet per minute to substantially close up pinholes in the first part of the deposit. During about the first three cycles of puffback cleaning and renewal of the panel bed, including renewal of the deposit at each gas entry face, the deposit becomes tougher and also fewer pinholes are present. Where vibrations or sudden changes in flow of gas cannot be avoided, the coherency of the surface layer deposit can be enhanced and reinforced by adding a reticulating agent to the fine granular or fibrous medium to create bonds between a suitable fraction of the particles of the medium.

43 Claims, 4 Drawing Figures

PRECOATING PANEL BED FOR FILTERING AEROSOL OF MICRON-SIZE PARTICULATES

CROSS-REFERENCE TO RELATED APPLICATIONS

This application is related to co-pending applications, filed on Aug. 28, 1974, numbered and entitled as follows:
1. Treating Gas and Granular Material in Panel Bed, Ser. No. 501,276
2. Filtering Dusty Gas in Panel Bed, Ser. No. 501,278
3. Countercurrent Contacting of Gas and Granular Material in Panel Bed, Ser. No. 501,277
4. Treating Gas and Fine Granular Material in Panel Bed, Ser. No. 501,275

The instant application is also related to co-pending applications, filed simultaneously herewith, numbered and entitled as follows:
5. Electrostatic Filtration in Panel Bed, Ser. No. 507,387
7. Treating Gas with Chemically Reactive Dust in Panel Bed, Ser. No. 507,286
8. Treating Gas with Catalytic Dust in Panel Bed, Ser. No. 507,385
9. Solid-Gas Heat Exchange in Countercurrent Contacting of Gas and Granular Material in Panel Bed, Ser. No. 507,398
10. Treating Gas and Wetted Granular Material in Panel Bed Ser. No. 507,377
11. Treating Liquid and Granular Material in Panel Bed Ser. No. 507,376

The instant application is the sixth of this sequence.

FIELD OF THE INVENTION

The invention relates to the filtering of dust from a gas by a panel bed of granular material having gas entry faces of the granular bed and fitted for puffback cleaning. Specifically, filtration of micron-size and sub-micron-size particulates, such as particles smaller than about 10 microns and especially those smaller than about 2 microns, is greatly improved by precoating the gas entry faces with a filter aid of fine particles intermediate in size between the granular material of the panel bed and the particulates to be filtered.

In one of its aspects, the invention relates to making coherent reinforced surface layer deposits for coordinately reinforcing the surface layer deposits and improving efficiency of filtration using such deposits in a renewable panel bed filter for treating a gas involving the separation and removal of micron-size particulate material.

DESCRIPTION OF THE PRIOR ART

The aforementioned co-pending application number 1, "Treating Gas and Granular Material in Panel Bed," furnishes a review of prior art relating to panel beds, with emphasis upon art relating to techniques for removing spent granular material, together with filtered dust if any is present, from fluid entry surfaces of such panels. We incorporate this review in the instant application by reference.

The earlier U.S. Pat. No. 3,296,775 (Jan. 10, 1967) taught a reverse surge flow of gas across a panel bed to produce a movement of the granular material in a mass toward the outer edges of louvers supporting gas entry faces, effecting a spill of the material from each face, and removing filter cake if present. The surge flow was to peak sharply to a flow substantially above the minimum steady flow rate at which a steady reverse flow of gas just causes motion of the granular material, and thereafter was to decline substantially immediately.

The aforementioned co-pending application number 1, "Treating Gas and Granular Material in Panel Bed," provides a more particular characterization of a reverse transient flow of gas (i.e., puffback) to produce a movement of granular material in mass (a "body movement") toward the gas entry faces of a panel bed.

The aforementioned co-pending application number 2, "Filtering Dusty Gas in Improved Panel Bed," provides an improved chevron louver for support of gas entry faces of a panel bed, with the advantage that filtered dust penetrating the bed is not dragged downward in the generaly motion of solid in the panel bed that follows puffback cleaning.

A review article in Journal of the Air Pollution Control Association, volume 20, pages 534–538, August 1970, of which one of us is a co-author, speculated upon the performance of a panel bed according to the teaching of the aforementioned U.S. Pat. No. 3,296,775 in filtering fly ash from the combustion of pulverized coal in a power station, where fly ash loadings in stack gas are on the order of 2 to 4 grains per cubic foot. A target of 99 per cent removal of the fly ash was recognized as one to be desired. It was speculated that if such an efficiency were not achieved, the manner of operation taught by U.S. Pat. No. 3,296,775 would allow the possibility of supplying a "filter aid" early in the filtration cycle to modify the characteristics of the fly ash cake and to improve the collection efficiency. A small quantity of a solid having a particle size intermediate between fly ash and filter sand present in the panel bed might be injected at the start of the cycle, or some coarse sizes of fly ash might be recovered and returned to the filter.

A second article in Journal of the Air Pollution Control Association, vol. 21, pages 204–209, April 1971, of which one of us is a co-author, announced an intention to use a dilute, monodisperse aerosol of polystyrene microspheres in experiments to explore the nature of a deposit of fly ash at various stages of its growth upon a static horizontal surface of a static nonrenewable bed of sand, the object of the experiments being to determine the penetration of the dilute aerosol through such a deposit at various stages of its growth. The motive for the experiments was the hope that some intervention might be found, along the lines of the aforementioned speculation, to modify a deposit of fly ash accumulating on the free surfaces of a renewable panel bed filter and thereby to improve efficiency of filtration of fly ash by the panel bed filter.

Some early results of experiments of this type were published in a dissertation written by Leon Carl Paretsky for the Doctor of Philosophy degree from The City University of New York, 1972. Paretsky's experiments did not lead to practical information on flow parameters relating either to forward flow through a renewable panel bed or reverse transient flow that would disclose or advance the teaching of efficient filtration of fly ash by panel beds. On a few occasions, Paretsky observed removal of a dilute, monodisperse aerosol of 1.1 micron polystyrene microspheres by a deposit of fly ash resting upon a horizontal static nonrenewable surface of 20–30 mesh (U.S. Standard) quartz sand, but on most occasions which he tried, the efficiency was poor, often, he reported, because cracks opened up thereby spoiling the deposit for removing the microspheres from the aerosol. Paretsky reported that the cracks "occurred quite randomly, withe no particular pattern." He speculated that cracks that appeared during the putting down of the deposit might possibly be "because of its own weight, or because of the impact of the next increment of ash." Paretsky noted that downward shifts in velocity sometimes produced cracks, and stated that only downward shifts in velocity would produce cracks. He reported that a deposit put down at a gas flow of 10.9 feet per minute (ft/min) entering the sand bed was more compact (i.e., less porous) than a deposit put down at 4.5 ft/min, and the former deposit afforded better aerosol removal in a subsequent removal test conducted at 4.5 ft/min. He also reported that a deposit put down at 10.9 ft/min was less porous than a deposit put down at 24.5 ft/min and had better aerosol removal capability. Paretsky commented that "pinholes" sometimes developed in the fly ash deposits, but he did not comment on their number in his several tests, nor upon procedures or conditions of operation that might be generally conducive to increasing or reducing their number. The few data found by Paretsky for removal of 1.1 micron particles by a deposit of fly ash resting on a static horizontal surface of sand were tantalizing, and we persisted in further more careful experimentation.

GENERAL DESCRIPTION OF THE INVENTION

We critically examined Paretsky's apparatus, and built modified and improved versions thereof after finding that many of Paretsky's teachings were incorrect and misleading. In carrying out Paretsky's procedure in his apparatus, we discovered that a valve in the set-up that was supposed to be tight would in fact often leak just a bit of air into a space below the sand bed thereby creating a reverse pressure differential across the fly ash deposit. We discovered that this leak and the reverse pressure differential associated therewith, of which Paretsky had no knowledge, created the undesirable condition of the large cracks seen by Paretsky, and not the weight of the deposits, as Paretsky had speculated. We have observed such cracks, using the Paretsky procedure, in upward as well as downward shifts in velocity, but these observations have no practical relevance to a situation where the accident of a reverse pressure differential across the deposits can be avoided, as can usually be done with no difficulty.

We also found that a deposit put down at a gas flow of 10.9 ft/min upon 20–30 mesh sand is more porous, not less porous as reported by Paretsky, than a deposit put down at 24.5 ft/min. The 10.9 ft/min deposit contains far fewer pinholes for gas to enter the bed, for all practical purposes bypassing the fly ash deposit, thereby accounting for its better removal of aerosol particles.

We have observed hairline cracks in fly ash deposits that can form under certain upset conditions in the gas flow through the deposits, of a type not observed or described by Paretsky and of a type less harmful to aerosol removal efficiency than the cracks Paretsky experienced.

As set forth in the co-pending application number 1, "Treating Gas and Granular Material in Panel Bed," there is a synergistic effect between the reverse transient flow particularly characterized therein for the ridding of gas entry surfaces of a panel bed of a fly ash deposit and the character of a later fly ash deposit upon a gas entry surface cleaned and renewed by the reverse transient flow. Specifically, the later fly ash deposit has the capability of filtering and removing dust from a gas entering the panel bed at a higher efficiency than a deposit put down upon clean sand that has not experienced puffback cleaning. The later fly ash deposit is less subject to spalling and cracking and less subject to presence therein of pinholes.

Further, in addition to the synergistic effect of proper puffback cleaning on fly ash deposit coherency, we have discovered particular procedures for creating fly ash deposits on the gas entry faces of a panel bed of exceptional coherency and freedom from presence of pinholes as well as from a tendency for the aforementioned hairline cracks to form. By precoating the gas entry faces of a renewable panel bed filter with coherent surface layer deposits made according to the newly discovered procedures, the filter can reliably afford collection efficiencies beyond 99.99 per cent for particles 1 micron and less in size.

We have also discovered procedures for reinforcing the fly ash deposits to ward off danger of spalling or cracking under influence of vibrations or sudden changes in flow, and also permitting use of the deposits for treating a gas at a higher throughput.

OBJECTS OF THE INVENTION

An object of the invention is to provide a filter method outstandingly high efficiency for collection of a dilute aerosol of particulate matter smaller than about 10 microns.

Another object of the invention is to provide a filter method of outstandingly high efficiency for collection of an aerosol of particles smaller than about 2 microns.

Another object is to provide a method of collecting radioactive dust particles of about 1 micron and less in size.

Another object is to provide a method for collecting radioactive dust particles from atmospheres unsuited for absolute filters fabricated from paper, such as humid atmospheres.

Another object is to provide a method for collecting radioactive dust particles unsuited for absolute filters fabricated from paper on account of the chemical activity of the particles toward paper.

Another object is to provide a method for collecting micron- and sub-micron-size fume particles from the combustion of heavy fuel oils, or soot from partial combustion of such oils.

Another object is to provide a method for collecting fume particles from a gas at high temperature.

Another object is to provide a method for making coherent surface layer deposits on gas entry faces of a panel bed filter for improving filtration efficiency toward micron- and sub-micron-size particulates.

Another object is to provide a method for making tough coherent surface layer deposits on gas entry faces of a panel bed filter with roots into the granular material of the sand bed to provide resilience and toughness against spalling or cracking from vibrations or hard knocks.

Another object is to provide a method for making coherent reinforced surface layer deposits for combination with a renewable panel bed filter method for removing micron- and sub-micron-size particulates from a gas.

Another object is to provide a method for making coherent reinforced surface layer deposits on gas entry faces of a panel bed filter than can withstand vibrations and sudden changes in gas flow without undue loss of coherency or loss of matter from the deposits on account of spalling.

SUMMARY OF THE METHOD FEATURES OF THE INVENTION

Our invention relates to an improved method of treating a gas for filtering the gas to remove micron-size particulate matter, that is to say, dust particles ranging from sub-micron sizes to sizes of about 10 microns, and especially particles smaller than about 5 microns that are hazardous to human health because the human respiratory tract has poor defences against such particles, and more particularly radioactive or pathogenic or carcinogenic particulate matter smaller than about 5 microns and other micron-size and sub-micron-size particulate matter difficult to remove from a gas by known filtraton or particle collection techniques. Granular material is arranged in a bed having a plurality of transversely disposed upwardly spaced gas entry portions separated by interposed supporting members having outer and inner edges. The gas entry portions have gas entry faces that are substantially contiguous with these outer edges. The granular material is preferably larger than about 100 mesh. The bed has gas exit portions spaced apart horizontally from the inner edges of the supporting members. A gas is caused to flow forwardly through the gas entry portions of the bed and outwardly from the gas exit portions while adding to the gas a granular or fibrous medium, preferably smaller than about 120 mesh. The rate of addition of the medium to the gas is preferably less than about 10 grams per cubic meter ($gm/m^3$) of the gas, and better still, less than about 5 $gm/m^3$. The medium separates and accumulates in precoat surface layer deposits on the gas entry faces. The gas enters the gas entry faces at a velocity greater than about 16 feet per minute (ft/min) during at least a part of the step of putting down the surface layer deposits. Thereafter, a transient flow of gas is caused to move in the direction in reverse to the aforementioned flow of gas to which the medium is added. The transient reverse flow produces first a rise (at a give rate of rise) and subsequently a fall in the pressure difference between the gas exit portions and the gas entry portions. This difference should remain greater than a first critical minimum difference for a time interval of less than about 150 milliseconds, and preferably less than about 50 milliseconds, this first critical minimum difference being that difference at which a steady flow of gas in the aforementioned reverse direction just produces a localized spill of granular material from the gas entry faces. The pressure difference produced by the transient reverse flow should peak to a top value beyond a second critical minimum difference, which is the pressure difference at which a transient flow of gas in the reverse direction, producing the second critical minimum difference at the aforementioned given rate of rise, just initiates a body movement of the granular material toward the gas entry faces to remove a portion of the granular material from the bed along with substantially all of the precoat surface layer deposits of the accumulated granular or fibrous medium. The second critical minimum difference depends upon the rate of rise in the pressure difference, being larger the more rapid the rise. Granular material is added to the bed to replace material spilled from the gas entry portions of the bed. The cycle of putting down precoat surface layer deposits, as hereinbefore described, and of causing a transient flow of gas to move in the aforementioned reverse direction and of adding granular material to the bed is repeated two more times, and the precoat deposits are put down a fourth time. Gas to be treated is also caused to flow forwardly into and from the panel bed, this gas containing micron-size particulate matter. The gas is treated through its contact with the precoat surface layer deposits to separate and accumulate the micron-size particulate matter in the deposits. The cycle of operation, including the putting down of the precoat deposits and the treating of the gas to be treated, the causing of the reverse transient flow of gas, and the adding of granular material, is repeated in a cyclic manner.

For convenience of reference, we use the term puffback for the specified reverse transient flow of gas and the term puffback cleaning to denote the operation whereby granular material is spilled from the gas entry portions of the panel bed.

During the step of putting down the precoat surface layer deposits, the gas preferably enters the gas entry faces at a velocity greater than about 30 feet per minute to accumulate a first portion of the deposits and subsequently the gas preferably enters at a second velocity below about 16 feet per minute to accumulate a second portion of the deposits whereby the pinholes present in the first portion are substantially filled and closed up.

The first aforementioned gas, that contains the medium to be deposited at gas entry faces, and the second aforementioned gas, the gas to be treated, are sometimes advantageously one and the same. In such a case, the granular or fibrous medium is preferably added during an early part of the treating time period, although sometimes satisfactory performance is obtained with addition of the medium throughout the gas-treating time period.

An important example where the gas that deposits the medium and the gas to be treated are often advantageously the same arises from the need to remove micron- and sub-micron size fume particles from the products of combustion of a heavy residual fuel oil. It will of course be recognized that the method of the invention also provides insurance against release of large soot particles from an oil combustion in poor control or in an upset condition. The granular or fibrous medium surface layer deposits are preferably put down by adding the medium to the combustion products and causing them to flow forwardly through the gas entry faces, initially at the first velocity, then at the second, and when the desired surface layer deposits are completed, the addition of the medium can be stopped and the combustion product gas further treated by passage through the deposits. In ordinary practice, the slippage of fume particles through the panel bed while the surface layer deposits are being put down can be tolerated. If such slippage must be avoided, the gas that deposits the medium is advantageously a different gas from the gas to be treated, and the first gas is advantageously treated gas from a second panel bed of the invention.

In some situations better efficiency will be wished for that the abovedescribed procedures will afford, and a more particular method for putting down the precoat surface layer deposits will be preferred. For example, high efficiency of removal of the aforementioned fume will be desirable if it contains vanadium pentoxide, a material thought to be harmful to human health. The more particular method is a three-increment procedure in which a first increment puts down roots attaching the subsequent deposited material firmly to the sand bed, a second increment builds up a coherent deposit of relatively low porosity but containing in general a number of pinhole defects through which gas can bypass the surface deposit and enter directly into the sand bed, and a third increment to close up the pinhole defects and improve efficiency of a subsequent use of the deposit to filter micron-size particulate matter from a gas. In the three-increment procedure, the gas to which the granular or fibrous medium is added first flows forwardly to enter the gas entry faces at a first velocity greater than about 16 ft/min (preferably greater than about 60 ft/min). A first increment of the medium is added to the gas until the medium separates and accumulates in surface layer deposits that produce a pressure drop in the gas of at least about 0.05 centimeters of water (cm) per ft/min of the first velocity. The gas then flows at a rate to enter the gas entry faces at a second velocity greater than about 16 ft/min (preferably greater than about 30 ft/min) while a second increment of the medium is added to the gas until the pressure difference across the deposits further increases by at least about 0.08 cm/(ft/min) and preferably by at least about 0.1 cm/(ft/min). Subsequently, the rate of flow of the gas is reduced so that the gas enters the gas entry faces at a third velocity which is less than about one-half of the first velocity and of the second velocity and also less than about 16 ft/min. A third increment of the medium is added to the gas flowing at the reduced rate of flow. The third increment of the medium is at least about 1 times as large, and preferably at least about 1.5 times as large, as the second increment when the aforementioned pressure drop increased by about 0.08 cm/(ft/min) with the addition of the second increment, and when the pressure drop increased by a substantially greater amount, the third increment is at least about 1 times as large, and preferably at least about 1.5 times as large, as the pro rata portion of the second increment that was responsible for an increase of exactly 0.08 cm/(ft/min).

Fly ash, substantially smaller than about 120 mesh, from the combustion of pulverized coal is a preferred granular medium for the surface layer deposits. When fly ash is used, the granular material of the panel bed is preferably smaller than about 20 mesh.

Where high efficiency of filtration of micron-size particulate matter is desired, the third increment is preferably even greater than the amount specified hereinbefore, and the third increment is preferably divided in several portions that are added separately as sub-increments, the gas velocity being cycled between each addition of a sub-increment. That is to say, after a portion or sub-increment of the third increment has been added to the deposits, the gas velocity would advantageously be increased to at least substantially the first velocity for a few minutes and often to a velocity higher still, then the velocity would be reduced to substantially the third velocity, another portion or sub-increment would be added, then the gas would be caused again to flow at a higher velocity as described, and so forth, until several sub-increments have been added, preferably more than three.

SUMMARY OF METHOD FEATURES FOR ULTRA-HIGH EFFICIENCY OF FILTRATION

Where ultra-high efficiency of removal of fume particles is desired, as for example in the filtration of micron- and sub-micron-size particles of radioactive matter, the granular material of the panel bed is advantageously smaller than that preferred for an application where a lesser efficiency is satisfactory. For example, if the preferred granular medium fly ash is used, the granular material of the panel bed is advantageously smaller than 40 mesh for ultra-high efficiency. The gas to deposit the surface layers of granular of fibrous medium is advantageously not the gas to be treated, and the treatment step is wholly subsequent to the step of laying down the surface layer deposits. The three-increment procedure for putting down the surface layer deposits is preferably used. The first velocity is advantageously beyond about 60 ft/min, and the second preferably beyond about 30 ft/min. The third velocity is advantageously about 8 to 12 ft/min. The second increment preferably increases the pressure drop by at least about 0.1 cm/(ft/min) and advantageously by at least about 0.15 cm/(ft/min). The third increment is preferably at least 1.5 times (better still, at least 2 times) as large as the second increment when the pressure drop increased with the addition of the second increment by about 0.1 cm/(ft/min), and when the pressure drop increased by a substantially greater amount, the third increment is preferably at least 1.5 times (better still, at least 2 times) as large as the pro rata portion of the second increment that was responsible for an increase of exactly 0.1 cm/(ft/min). The third increment is advantageously even greater and divided in several portions that are deposited separately in sub-increments, the gas velocity being cycled between each addition of a sub-increment as hereinbefore described. The velocity of the gas to be treated is preferably caused to enter the gas entry faces at substantially the third, lower velocity, or at a velocity only a little greater, except in circumstances, to be described hereinafter, when the surface layer deposits are reinforced by reticulation.

It will be understood that for ultra-high efficiency, it is preferable to put down precoat surface layer deposits with another gas, not the gas to be treated, during three complete cycles of putting down the deposits, removing them by puffback cleaning, and adding new granular material to the panel bed. Only after the fourth precoat surface layer deposits are in place is it advisable to begin treatment of the gas containing micron-size particulate matter whose filtration is desired at an ultra-high efficiency, such as about 99.99 percent removal.

When fly ash from the combustion of pulverized coal is used in the method for ultra-high efficiency, it is preferably screened to remove particles substantially larger than 200 mesh.

The method for ultra-high efficiency is advantageous for removing micron-size dust particles from the atmosphere of a mine or uranium ore. The particles often bear radioactive daughters of radon gas. The atmosphere is often so humid as to destroy the good working of an absolute filter constructed of paper within a short time of operation.

The method is also useful for removing micron-size particles of radioactive sodium oxide from a gas withdrawn from the containment of a nuclear reactor cooled by liquid sodium. Such particles are chemically destructive toward the paper of the conventional absolute filter.

The method can also provide antiseptic air, for example to a hospital operating room, by removing air-borne pathogens. The method can also rid air or industrial waste gases of pathogenic materials such as the highly carcinogenic micron-size particles of asbestos.

SUMMARY OF METHOD FEATURES FOR REINFORCING SURFACE LAYER DEPOSITS

The abovedescribed procedures work best if the panel bed can be mounted to be relatively free of vibrations. If a vibration-free mounting cannot be readily provided for a particular application, or if the gas flow in the application is subject to sudden changes in flow and especially large sudden changes that are not readily controllable by an operator to mitigate the suddenness of the change, then the abovedescribed surface deposits will sometimes lose their coherency and become spoiled for filtration at high efficiency. The deposits may spall from the gas entry faces, for example, or they may crack or develop pinholes.

For such a particular application, the renewable panel bed filter method of the instant invention is improved by coordinately making reinforced surface layer deposits on the gas entry faces of improved coherency.

The reinforced surface layer deposits are made by admixing a reticulating agent with the fine granular medium. The reticulating agent establishes bonds between adjacent particles of the medium at at least a fraction of the points of contact among the particles of the medium to provide a reticular network of the particles thereby reinforcing the surface layer deposits and rendering them less vulnerable to spalling or cracking or development of pinholes under influence of vibrations or sudden changes in pressure difference across the deposits caused by sudden changes in gas flow.

The reticulating agent is suitably a cementing material, that is to say, a cementitious material, ranging from lime and hydraulic lime to mixtures of lime with pozzolans or pozzolanic materials and to calcined impure gypsums and to so-called "natural cement" and portland cement [for a discussion of cementitious materials, see Robert F. Blanks and Henry L. Kennedy, The Technology of Cement and Concrete, Volume I, Concrete Materials, John Wiley, New York, 1955, pages 3–5 and especially pages 40–46 and page 72 for discussion of quick-setting cements not normally preferred in cement and concrete art but often a preferred cementitious material for use as a reticulating agent]. If the reticulating agent is a cementitious material, water should be provided to wet the surface layer deposits.

Another reticulating agent is a mist of droplets of a solution, suspension, or emulsion of an asphalt or pitch or tar in a liquid that subsequently vaporizes from the surface layer deposits. Other reticulating agents are mists of solutions, suspensions, or emulsions of a polymerized or polymerizable substance or mixture of substances in liquids that vaporize from the deposits, such as water emulsions of epoxy materials, acrylic materials, or epoxy-acrylic mixtures in water. Almost any sticky substance in mist-form is suitable, preferably in a diluted form in a solution, suspension, or emulsion in water or other liquid. Sodium silicate and even many common glues are suitable sticky substances. The selected sticky substance preferably has a viscosity greater than about the viscosity of glycerine at room temperature and is preferably also viscoelastic.

The method of reinforcing the surface layer deposits has especial value coordinately with the improved panel bed filter method for removing radioactive or pathogenic or carcinogenic micron-size particulate matter from a gas where the panel bed is subject to strong vibrations or sharply varying flows.

The method of reinforcing the surface layer deposits has the broad advantage that higher flow rates may be used during the filtration for removal of micron-size particulate matter with less risk of damaging the deposits.

SUMMARY OF METHOD FEATURES FOR PLACING GAS ENTRY FACES IN LESS THAN PERFECT CONTIGUITY WITH OUTER EDGES OF SUPPORT MEMBERS

Where it is advantageous to keep the pressure drop in the gas being treated as low as possible, it will be preferable to use a granular material larger than about 20 mesh together with a fibrous medium such as asbestos in the surface layer deposits. The surface layer deposits for meeting the prescribed pressure drop relationships between quanties of first, second, and third increments of the medium become much thicker if a fibrous medium is used in deposits on 10–14 mesh sand, say, than if fly ash is used in deposits on sand smaller than 20 mesh. A problem arises that the deposits of the fibrous medium are vulnerable to spalling from the gas entry faces. It is preferable to arrange the granular material in a panel bed where a typical supporting member has an upper and a lower surface each having outer and inner edges with respect to the bed, the surfaces being articulated at an edge joint at their respective inner edges. Each of the surfaces is gently curved and inclines downwardly and inwardly from its outer edge and then upwardly and inwardly toward the edge joint. The upper surface of a given member and the lower surface of the next superjacent member cooperate to support and retain a gas entry portion having a gas entry face substantially contiguous but not in perfect contiguity with the outer edges of the surfaces. The gas for putting down the surface layer deposits and the gas to be treated would be caused to flow forwardly through the panel bed, as before, and the panel bed would be cleaned and renewed by a puffback that both moves the gas entry faces into perfect contiguity with the outer edges of the upper and lower surfaces and also spills granular material and the accumulated medium from the gas entry faces. Then a gas would be caused suddenly to flow forwardly into the gas entry portions of the granular material bed with the effect of spalling some of the material from the gas entry faces and also preferably to cause a body movement of the granular material bed inwardly on account of a compaction of the bed under the influence of the sudden forward flow of gas. The effect is to move the gas entry faces a small distance out of perfect contiguity with the aforementioned edges of upper and lower surfaces of the supporting members. The small distance is suitably about one- to three-sixteenths of an inch, leaving the gas entry faces substantially contiguous with the outer edges but not in perfect contiguity. The cycle of operation would then be repeated, with the advantage that the small distance provides room for the acccumulation of surface layer deposits less vulnerable to spalling.

The abovedescribed method is particularly advantageous coordinately with reticulation to reinforce the surface deposits.

BRIEF DESCRIPTION OF THE DRAWINGS

The invention will be more particularly described in conjunction with the following drawings wherein:

FIG. 2 is a top view of the panel of FIG. 1;

FIG. 3 is a schematic diagram illustrating use of the invention to filter an aerosol of extremely fine particles;

DESCRIPTION OF THE PREFERRED EMBODIMENTS

Figure 1:
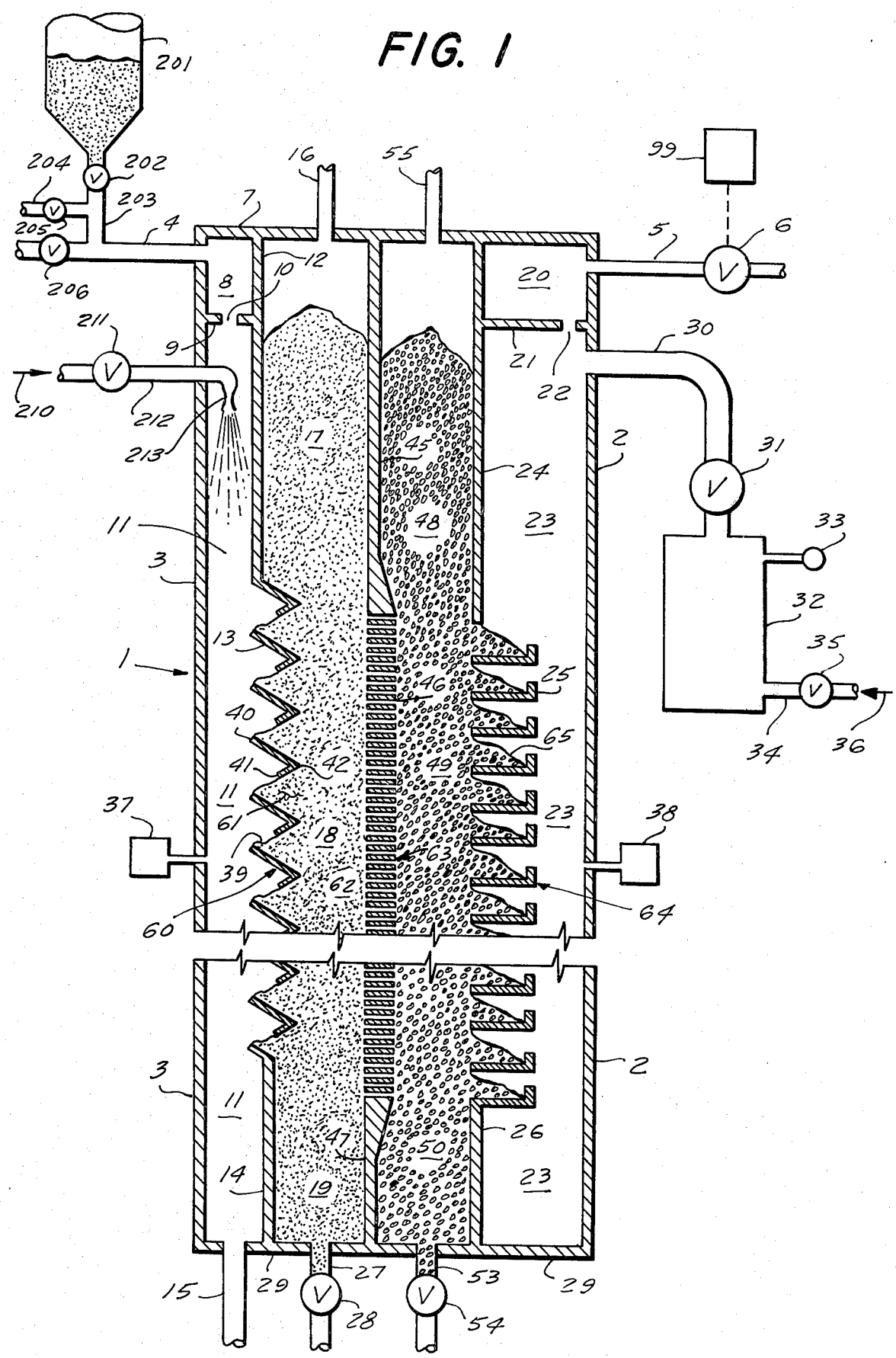
FIG. 1 is a veretical section view of a preferred panel bed filter with provision for providing a precoat on gas entry faces.
Figure 4:
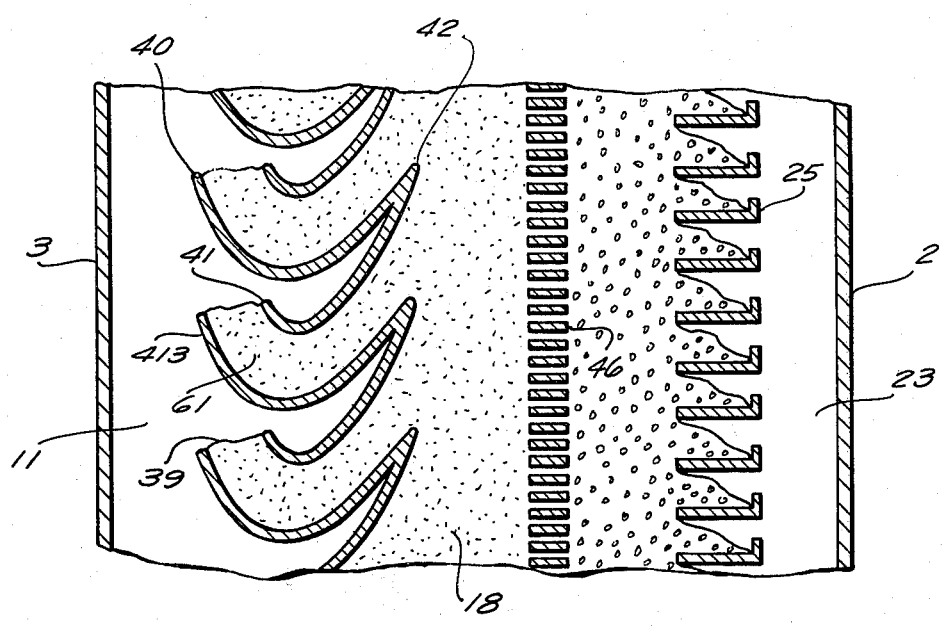
FIG. 4 is a cutaway view of an alternative design of the supporting members of the gas entry face of the panel bed filter, useful for a method for putting the gas entry faces of the granular material bed out of perfect contiguity with the outer edges of the supporting members.

In the several figures, like reference numerals refer to like parts having like functions. In FIG. 1 the panel bed filter 1 comprises a casing of rectangular cross-section having opposed side walls 2 and 3 and top plate 7 and bottom plate 29. Opposed edge walls 51 and 52 are to be seen in FIG. 2, a top view. A generally vertical bed of granular filter material 18 is within the casing and retained by vertically extending, horizontally spaced-apart, perforate walls 60 and 63. Granular material is supplied by gravity feed to bed 18 from supply bed 17, retained between imperforate walls 12 and 45. Additional granular material may be added to bed 17 from pipe 16. Granular bed 18 may be drained, if desired, via space 19 between walls 14 and 47, normally filled with static granular material, by means of pipe 27 and valve 28. Perforate wall 63 comprises a series of horizontal louvers or slats 46 mounted one above another in a structure resembling subway grating and narrowly spaced apart in the vertical direction. Horizontally spaced apart from wall 63 is perforate wall 64 comprising a series of generally horizontal louvers or slats 25 also mounted one above another. Granular material bed 49, comprising material considerably coarser in size than the material of bed 18, is retained by perforate walls 63 and 64, and is supplied from supply bed 48, retained between imperforate walls 45 and 24. Additional granular material of the coarser character may be added to bed 48 from pipe 55. Granular bed 49 may be drained, if desired, via space 50 between walls 47 and 26, normally filled with static granular material, by means of pipe 53 and valve 54. Walls 12, 60, 14, 3, 51, and 52, bottom 29, and partition 9 enclose gas entry compartment 11, to which gas to be treated is supplied from pipe 4 via plenum space 8 and slot 10 in partition 9 (the slot 10 preferably extending from wall 51 to wall 52). Walls 24, 64, 26, 2, 51, and 52, bottom 29, and partition 21 enclose gas exit compartment 23, from which gas leaves via slot 22 in partition 21 (the slot 22 preferably running from wall 51 to wall 52) via plenum space 20 to pipe 5. Louvers 25 cooperate to support gas exit surfaces 65 of bed 49.

Perforate wall 60 comprises a series of members 13. A member 13 typically has an upper surface with outer edge 40 and inner edge 42 in respect to granular bed 18, and cooperating therewith a lower surface with outer edge 41 and inner edge 42, the two inner edges being articulated together in an edge joint. The perforations of wall 60 are to be considered a being formed between respective inner edge joints 42 of adjacent members 13. The members 13 are mounted in a manner such that they cooperate to support gas entry portions 61 of bed 18, viz., the angle of a line drawn through edge 41 of a given member and edge 40 of the next subjacent member should preferably be less than about 25° from the horizontal, an angle less than the angle of repose of most granular materials that might preferably be employed in bed 18. It will be seen that the gas entry portions 61 are transversely disposed, upwardly spaced, and separated by the interposed supporting members 13, the gas entry portions having gas entry faces 39 that are substantially contiguous with outer edges 40. A line drawn through edge 41 of a typical member 13 and edge joint 42 of the subjacent member 13 is inclined at an angle less than about 60° from the horizontal. Gas exit portions of bed 18 are seen generally at 62, and are spaced from edge joints 42.

Pipe 30 connects gas exit compartment 23 with tank 32, quick-opening valve 31 being provided to isolate tank 32 from space 23. Tank 32 is connected to source 36 of gas under pressure via line 34 and valve 35. Pressure gauge 33 is provided to help adjust the pressure of gas in tank 32.

Hopper 201 is provided for holding a granular or fibrous material substantially smaller than the granular material of bed 18. The finer material of hopper 201 can be introduced into gas flowing in pipe 4 toward lenum 8 by opening valve 202. Line 4 is provided with valve 206, and an alternative source of gas to pipe 4 is provided from pipe 204 fitted with valve 205.

Figures 2, 3:
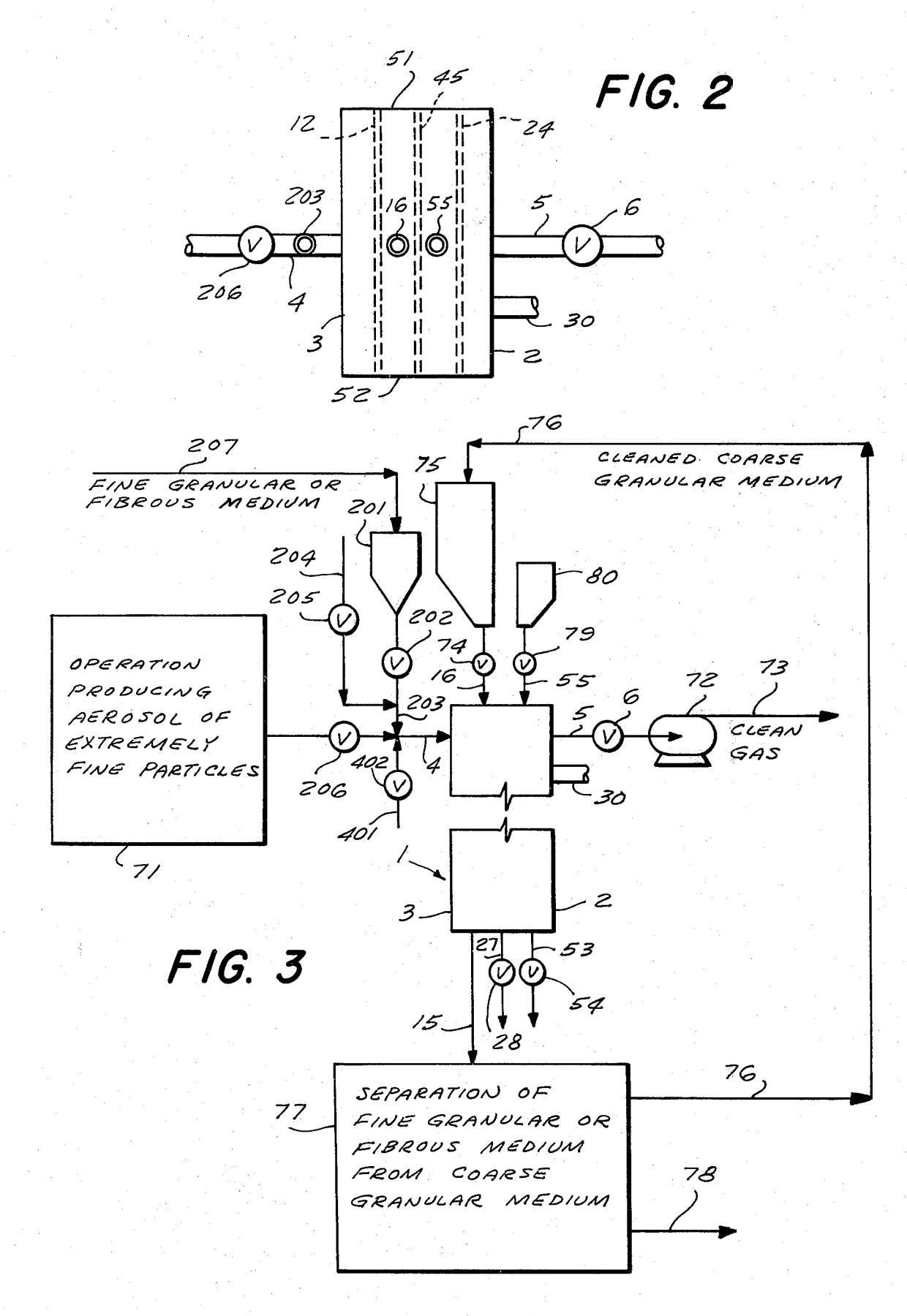

In operation of panel bed filter 1, the panel bed 1 is initially charged with a first granular material, such as a quartz sand substantially smaller than 20 mesh (U.S. Standard) and preferably larger than about 100 mesh, from line 16, filling spaces 19, 18, and 17 as shown in FIG. 1. Spaces 50, 49, and 48 are also charged with a second, coarser granular material, from line 55, such as a quartz sand of about 10–14 mesh. A fine granular or fibrous material is supplied to hopper 201. Panel bed 1 is connected to a process 71 producing a gas containing an aerosol of extremely fine particles, such as particles smaller than 10 microns, via gas-entry pipe 4, as shown in FIG. 3. A precoat of the fine granular or fibrous material is laid down on the gas entry surfaces 39 of bed 18 in a manner hereafter desscribed, and gas from process 71 is caused to flow forwardly through panel bed 1 by opening valve 6 in pipe 5 and valve 206 in pipe 4. Blower 72 is provided to carry gas from pipe 5 to line 73 for conducting clean gas from the system. Periodically, tank 32 is filled with gas at pressure from supply 36, valve 35 is closed, valve 6 is closed to interrupt the flow of gas being filtered, and valve 31 is opened quickly to produce the specified transient reverse flow from compartment 23 to compartment 11. Pipe 15 is provided to withdraw precoat particles with accumulated deposits of the extremely fine particles in the gas from process 71 along with granular filter material spilled from surfaces 39. As seen in FIG. 3, pipe 15 advantageously conducts the spilled solids to means 77 for separating the fine granular or fibrous precoat medium from the coarser granular material provided to bed 18, for example, by screening or elutriating the finer particles away from the coarser granular material. Pipe 78 is provided for withdrawal of finer matter from means 77, and pipe 76, for return of granular material to supply hopper 75, from which the material may be returned to bed 18 via valve 74 and pipe 16. Supply hopper 80 may conveniently be provided to hold the aforementioned second, coarser granular material in readiness for supply to spaces 48, 49, and 50 via valve 79 and pipe 55. After a few seconds for dust to settle to the bottom of compartment 11, valve 31 is closed, and valve 6 is opened to resume filtration by the freshly cleaned bed 18.

Transducers 37 and 38, seen in FIG. 1, are conveniently provided in a test to determine the aforementioned first and second critical minimum pressure differences between space 23 and space 11, although competent fluid dynamicists will be able to calculate instantaneous pressure difference versus time in a test of puffback, given the porosity of beds 18 and 49, the size of valve 31, the speed of its opening, the size of tank 32, the pressure therein, the length and the diameter of line 30, and the dimensions of compartment 23. Tests for determining the critical pressure differences and illustrating the suitable limits on the time interval during which the puffback maintains the reverse pressure difference above the first critical minimum difference are discussed more fully in the aforementioned co-pending application number 1, "Treating Gas and Granular Material in Panel Bed," together with representative data, and this discussion is incorporated herein by reference. In brief, a time interval of about 150 milliseconds represents an approximate upper limit for acceptable performance, beyond which spills from individual gas entry surfaces 39 are badly distributed, there being far more spill from surfaces near the top of a panel like that seen in FIG. 1 than from surfaces near the bottom, and beyond which spills also partake disadvantageously more of the character of a localized spill and less of the character of the preferred body movement. A practical minimum time interval for operation of the arrangement of FIG. 1 appears to be about 3 to 5 milliseconds, given the practical requirement that space 23 must be large enough to accommodate a flow of gas leaving wall 64. It should be noted, however, that one might, for example, achieve an extremely short time interval by mounting a large number of blank cartridges on wall 2 and by firing them simultaneously to discharge gas explosively into space 23; or one might provide an arrangement whereby wall 2 might be displaced almost instantaneously toward wall 64.

Immediately after the puffback, the granular material of bed 18 moves downward to make good losses of material from the gas entry faces 39. The above-specified angle of less than about 60° ensures that granular material a short distance inward from edge 41 will not participate in the downward movement, carrying down with it any dust or any of the fine granular or fibrous medium that may have penetrated this short distance into bed 18, because a line drawn through a given edge joint 42 and passing upward and outward (i.e., leftward in FIG. 1) at the angle of the failure plane of the granular material (generally between about 65° and 70° for most material that might advantageously be used) will strike the lower surface of the next superjacent member at a point inward from edge 41 of this member.

In operation of panel bed 1, it is preferable that valve 6 be opened slowly at the start of each gas-filtration cycle, so that a sudden rush of gas into the bed 18 from compartment 11 via surfaces 39 does not compact the bed and cause gaps to appear beneath the surfaces of members 13 extending from edges 41 to edge joints 42.

It is also preferable that any changes in gas flow be made gradually and especially not instantaneously, lest a sudden change in the gas flow injure the precoat surface deposits on gas entry faces 39. Control means 99 is advantageously provided to ensure that any changes in the position of valve 6 be made slowly.

It is also important that the pressure difference across panel bed does not reverse except during puffback. A reversal of the pressure difference during operation with precoat surface layer deposits in place is apt to create large cracks in the deposits spoiling their effectiveness in removing micron-size particulate matter. We note, however, that should such cracks appear, an attempt to seal the cracks by putting down additional fine granular or fibrous medium is sometimes successful.

We have conducted extensive experiments in which we deposited a layer of fly ash from the combustion of pulverized coal upon a horizontal surface of quartz sand. Our fly ash supply was taken from a power station fitted with an electrostatic precipitator having an efficiency beyond 99 per cent and was substantially smaller than 120 mesh, about 3 weight per cent of the fly ash being removed if it was screened through a 120 mesh screen. We dispersed the fly ash at a given rate of feed into a gas stream flowing at a given rate and passing downward across the free horizontal upper surface of a sand bed in order to accumulate a layer deposit of fly ash on the surface. A wide range of thickness of the fly ash layer was studied, as well as a range of rate of fly ash feed and a range of gas velocity at which the layer was put down. A dilute monodisperse aerosol of polystyrene microspheres 1.1 micron in diameter was passed through the fly ash layer and the sand bed supporting the layer, and the penetration of the aerosol through ash layer and sand bed was determined. From an earlier measurement of the penetration of the aerosol through the sand bed alone, we reckoned the penetration of the aerosol through the fly ash layer alone from the measured penetration through both layer and bed. [See the aforementioned second article in Journal of the Air Pollution Control Association for represntative aerosol penetration data for sand beds alone as well as some details of our procedures for generating the 1.1 micron aerosol and measuring its penetration.] We selected the 1.1 micron aerosol because it is used in standard tests of the performance of absolute filters for use by the United States Atomic Energy Commission. We draw attention to the expectation that lower penetrations (i.e., higher removal efficiencies) would be observed with use of an aerosol particles very much smaller than 1.1 micron. For a given filter arrangement of granular or fibrous materials or combinations therof, and for a given gas flowing at a given velocity, there is a particle size that displays the maximum penetration (i.e., poorest removal efficiency). See American Medical Association Archives of Industrial Health, volume 13, pages 545 through 555 (1956) for data tending to show that the particle size of maximum penetration is usually between about 0.5 and 0.9 microns for many experimental filter arrangements, and that the penetration of a 1.1 micron particle is not greatly different from the maximum. The 1.1 micron particle is a convenient standard test particle since its penetration is relatively easy to measure. Particles much smaller than the particle of maximum penetration collect well by the agency of Brownian diffusion.

Some general conclusions from our experiments were:

1. We were not able to put down a coherent surface layer deposit of fly ash on 10–14 mesh quartz sand. Looking down at the surface of a deposit, we could always see holes for gas to enter the bed that corresponded to substantially each available surface opening among the grains of the sand.

2. We were able to put down satisfactorily coherent surface layer deposits of fly ash on 20–30 mesh and 40–50 mesh sands. In general, the layer deposits had at least a few pinholes for gas to enter the bed, that is to say, craters in the deposit that were relatively free of fly ash and would allow a gas to bypass the deposit and to flow almost directly into several surface openings among the grains of sand. There were more pinholes in deposits on the coarser sand and in deposits put down at higher velocity.

3. We confirmed a conclusion of the aforementioned dissertation by Paretsky, viz., that a deposit is denser and less porous if it is made at a lower rate of addition of fly ash to the depositing gas flow. Paretsky did not report rates of addition except in qualitative terms. We found that best results, i.e., dense deposits, were acvhieved at a rate of addition of less than about 5 gm/m$^3$, and results are satisfactory at below about 10 gm/m$^3$.

4. We confirmed another conclusion of Paretsky, viz., that a deposit put down at 10.9 ft/min is denser and less porous than a deposit put down at 4.8 ft/min. A deposit put down at 4.8 ft/min on 40–50 mesh sand, not studied by Paretsky, is unusually fluffy and light and porous.

5. Contrary to Paretsky's statement, we found that a deposit put down at 21 to 25 ft/min is denser and less porous than a deposit put down at the higher velocity, however, contains far too many pinholes for it to be considered for use as is in a filtration for ultra-high efficiency. Typically, on a horizontal sand surface 2 inches in diameter, we would see about 200 pinholes in a deposit laid down on 20–30 mesh sand at 21 ft/min and creating a pressure drop of about 0.13 to about 0.16 cm/(ft/min). We would see about 20 to 30 somewhat smaller pinholes in a deposit laid down on 40–50 mesh sand at 21 ft/min, at a pressure drop in this approximate range.

6. We found a velocity of about 10.9 ft/min to be best for putting down a fly ash surface layer deposit if the object was to use the deposit for filtering the 1.1 micron aerosol at the same velocity as that at which the deposit was put down. In a careful experiment, we put down a progressively thicker fly ash deposit on 40–50 mesh sand at a velocity of 10.9 ft/min. At several stages, we interrupted the putting down of the deposit to measure the penetration of the 1.1 micron aerosol at 10.9 ft/min. We obtained percentage penetrations of 9, 0.7, 0.05, 0.0015, and below 0.0001 at thicknesses of the cake to cause pressure drops in the gas of 0.15, 0.25, 0.35, 0.5, and 0.75 cm/(ft/min) respectively. In other careful attempts to put down a deposit at 10.9 ft/min, we almost invariably saw one to three pinholes, increasing the penetration to about 0.005 per cent at 0.75 cm/(ft/min). In similar careful experiments on 20–30 mesh sand, also at 10.9 ft/min, we observed percentage penetrations of 20, 6, about 1 between about 0.1 and 0.2, and between about 0.02 and 0.07 at pressure drops of 0.15, 0.25, 0.35, 0.5, and 0.75 cm/(ft/min) respectively. There was considerable variation in results at the higher pressure drops (i.e., thicker deposits). We attribute this variation to the change in number of pinholes that we saw in the deposits put down at 10.9 ft/min, usually between about 10 and 20 for our 2-inch diameter sand bed.

7. We were not satisfied with the gas-treating capacity that we projected for a panel bed filter with a gas velocity entering the gas entry faces of only 10.9 ft/min, especially for applications where large flows of gas must be handled, such as the products of combustion of a heavy oil used for generating electricity. [For example, the gas entry faces of the arrangement of FIG. 1 have a total area about one-half of the vertical projected area of the bed 18. Accordingly, at a velocity of 10.9 ft/min for gas entering surfaces 39, the face velocity for the panel bed (i.e., the horizontal velocity of gas across bed 18) would be only about 5.5 ft/min.] We then discovered that we could close up pinholes in deposits put down at high velocity by putting down more fly ash at a low velocity. For example, the about 200 pinholes in a fly ash deposit put down on 20–30 mesh sand at 21 ft/min to a pressure drop of about 0.13 cm/(ft/min) could be fully closed by putting down more fly ash at 4.8 or 10.9 ft/min to increase the pressure drop to about 0.3 cm/(ft/min). A significant fact is that it took much more fly ash at 21 ft/min to develop a pressure drop of about 0.13 cm/(ft/min) than it took at 10.9 ft/min: typically about 1.5 grams at the higher velocity and about 0.55 grams at the lower. We will comment further on this fact shortly, but we should point out here that the curve of pressure drop versus quantity of fly ash deposited is not linear at small quantities of fly ash. Typically, it took a first increment of about 1 gram of fly ash at 21 ft/min to create a pressure drop of about 0.05 cm/(ft/min), and a second increment of about 0.5 grams of fly ash at 21 ft/min to increase the pressure drop to about 0.13 cm/(ft/min). Thereafter, the increase in pressure drop with quantity of fly ash deposited at 21 ft/min is linear for all practical purposes. After we had closed up the pinholes by a typical further deposit of fly ash at 4.8 ft/min to a pressure drop of 0.3 cm/(ft/min), we restored the gas flow to 21 ft/min without further addition of fly ash. Almost at once, in several experiments of this type, from 7 to 10 pinholes opened up in the fly ash deposit. Usually, in about 5 minutes, roughly 5 additional pinholes opened up. Thereafter, the deposit maintained its coherency during an hour or more of gas flow at 21 ft/min.

8. In another example, the about 20 to 30 tiny pinholes in a fly ash deposit put down on 40–50 mesh sand at 21 ft/min to a pressure drop of about 0.16 cm/(ft/min) could be fully closed by putting down more fly ash at 4.8 ft/min. About 0.4 grams of fly ash were deposited at 21 ft/min to create a pressure drop of 0.05 cm/(ft/min), and a further second increment of about 0.35 grams of fly ash increased the pressure drop to about 0.16 cm/(ft/min). The deposit at 4.8 ft/min was extremely fluffy by comparison with other deposits of our experience, and Darcy's law could not be relied upon to relate the increase in pressure drop created by the deposit at 4.8 ft/min to the aforementioned increase from 0.05 to 0.16 cm/(ft/min) with deposit of 0.35 grams at 21 ft/min. Indeed, a deposit of 1.25 gram at 4.8 ft/min increased the pressure drop by only 0.08 cm/(ft/min), whereas based upon Darcy's law (that is to say, in a mistaken expectation that the deposit at 4.8 ft/min would have the same porosity as the deposit at 21 ft/min) one would have expected a deposit of 1.25 gram to increase the pressure drop by about (1.25/0.35) × 0.11 = 0.39 cm/(ft/min), based upon the earlier increase from 0.05 to 0.16 cm/(ft/min) with the deposit of 0.35 grams. In light of these data, we appreciated that we could not characterize the third increment of fly ash by the increase in pressure drop that the increment creates, but must characterize the third increment in terms of its weight relative to the second increment. We prefer 10.9 ft/min for the third increment to 4.8 ft/min because the deposit at 10.9 ft/min is less porous. After we had closed up the pinholes by adding the third increment, we restored the gas flow to 21 ft/min without further addition of fly ash. A few exceedingly tiny pinholes opened up just at the wall of the transparent chamber housing our sand bed. It was interesting to note that the pressure drop at the higher velocity was 0.47 cm/(ft/min), and so the fluffy deposit put down at 4.8 ft/min had evidently become more compact and the increase in pressure drop was the value 0.31 cm/(ft/min), just a little below the aforementioned value of 0.39 cm/(ft/min) calculated in the mistaken expectation that Darcy's law would hold.

9. At this stage, we appreciated that the three-increment procedure used in (7) and (8) above offers two important advantages:
   a. A deposit can be created on 20–30 mesh sand for use at a velocity of 21 ft/min without the large number of pinholes that would appear in the deposit if the same weight of fly ash were to be put down all at 21 ft/min.
   b. A deposit can be created on 40–50 mesh sand with few if any pinholes, and these all exceedingly tiny, to afford ultra-efficiency of filtration at 10.9 ft/min. Another important advantage emerged as we experimented further with deposits put down by the three-increment procedure. The deposits were far tougher against sudden changes in flow rate and against vibrations and hard knocks than the deposits in (6) above, that we had previously thought best. We believe that the toughness of the three-increment deposits by comparison with deposits put down all at 10.9 ft/min, and especially by comparison with those put down at 4.8 ft/min, is a consequence of the aforementioned larger amount of fly ash that must be provided at the higher velocity to bring the pressure drop to 0.05 cm/(ft/min). The three-increment deposit "puts down roots," so to speak, that the deposits made at low velocity do not have. Much of the first fly ash provided at the higher velocity of the first increment penetrates deep into the sand bed. This explains the larger quantity of fly ash required to create a pressure drop of 0.05 cm/(ft/min) when the deposit is made at 21 ft/min than when it is made at 10.9 ft/min. The deposit that results from the three-increment procedure appears to be bound to the sand bed more intimately than a low-velocity deposit, especially one made at 4.8 ft/min, which "sits high" on the sand with few "roots" from the deposit into the sand. The latter deposit on 40–50 mesh sand cracks badly if suddenly placed into communication with an upstream source of gas at about 5 pounds per square inch gauge, creating a surge of pressure just above the deposit of about 85 cm in about 30 milliseconds. A similar surge of pressure produced a few extremely fine cracks in a three-increment deposit on the 40–50 mesh sand, but the damage was nowhere nearly so serious. Placing the 20–30 mesh sand bed suddenly into communication with a vacuum of about 60 cm of mercury on the gas discharge side below the deposit, to produce a surge dip in pressure below the deposit of about 30 cm of water (cm) in about 30 milliseconds, pulled the deposit into the sand bed with formation of about 150 to 200 pinholes but no cracks. A similar experiment with the 40–50 mesh sand had no visible effect upon the deposit. Such large surges of pressure can and should generally be avoided in practice of the method of the invention, but it is also evident that damage caused by such surges might be repaired by putting down an additional increment of fly ash at low velocity. With its new roots in the sand bed, the repaired deposits might indeed be tougher than before.

We have found the three-increment deposits quite rugged to establishment of full flow and full pressure difference in about 100 milliseconds, if the flow is established from a source of gas at a normal operational pressure difference in respect to the deposits. Even strong knocks, that would produce serious cracks in deposits put down entirely at low velocity, appear to produce only fine cracks.

After the abovedescribed experimentation with deposits of fly ash on static horizontal nonrenewable surfaces of sand and in light of the information gained therefrom, we returned to experiments with a panel bed, which confirmed that fly ash deposits put down at high velocity on the gas entry faces of a panel bed tend to have a large number of pinholes, hurting efficiency, but are tough and resilient and resistant to cracking under hard knocks or vibrations, because of the roots that are evidently put down from a deposit into the sand bed if the deposit is formed at a high velocity. We also found that the deposits put down at high velocity resist spalling, i.e., shedding of fly ash from the deposit into the gas entry compartment 11.

The panel bed experiemnts also confirmed that deposits put down at low velocity tend to have far fewer pinholes, but are weak and vulnerable to cracking. Although such deposits ought to afford good removal of micron-zie particulate matter in a filtration, their practical utility is small.

We confirmed what our experiments on static horizontal sand surfaces had led us to expect, that a velocity of about 16 feet per minute entering the gas entry faces 39 is approximately the lower limit for putting down a deposit of adequate toughness against spalling and cracking, and we prefer velocities beyond about 30 feet per minute, and in particular, we prefer a velocity beyond about 60 feet per minute for the putting down of a first increment to provide a pressure differential of about 0.05 cm/(ft/min).

We also confirmed that a velocity of about 16 feet per minute entering the gas entry faces 39 is approximately the upper limit for providing a later portion of a deposit to substantially close up pinholes present in a first portion of the deposit put down at high velocity. We prefer lower velocities, preferably below about 12 feet per minute, for closing up pinholes and increasing efficiency of removal of micron-size particulate matter in a subsequent use of the deposit to filter such matter.

We have discovered that the toughness of the deposits put down at high velocity is enhanced by the repetition of the cycle of putting them down and removing them by puffback cleaning. It is as if their roots dig deeper, or are greater in number, when the deposits are put down on the somewhat dirty sand that results from puffback cleaning and renewal than when the deposits are put down on fresh sand. The improvement in toughness is striking through at least about the third cycle.

Moreover, the number of pinholes in the high-velocity deposits diminishes with number of cycles. The improvement is perceptible through about the third cycle, making the deposits more acceptable for treating of a gas to remove micron-size particulates where ultra-high efficiency is not required, and thereby making it less important to close up the pinholes in the deposits through a step at low velocity, and sometimes making this step dispensible where a moderate efficiency is acceptable. We have obtained data that strongly suggests that the efficiency of the high-velocity deposits may continue to improve for filtering particles between about 2 and 10 microns in size through at least about a twentieth cycle of making the deposits and removing them by puffback cleaning.

It is evident that practicable performance of the panel bed with precoat surface layer deposits first of all requires that the deposits be tough and resilient and resistant to spalling and cracking under vibrations or sudden changes in gas flow or strong knocks. Accordingly, the step of putting down a first portion of the precoat surface layer deposits at the high velocity has broader importance and utility than a subsequent step of closing up pinholes by putting down a later portion of the deposit at a low velocity, although this is not to depreciate the importance of the latter step if ultra-high efficiency of removal of micron-size particulate matter is required.

METHOD FOR ULTRA-HIGH EFFICIENCY

We now recommend a method of operation of the arrangement of FIGS. 1, 2, and 3 to precoat gas entry surfaces of bed 18 with coherent fly ash deposits to promote ultra-high efficiency in the removal of micron-size particles of radioactive or pathogenic or carcinogenic matter. Bed 18 would be charged with 40–50 mesh quartz sand, or preferably with 40–80 mesh sand. Bed 49 could advantageously be charged with sand of about 14–20 mesh. Blower 72 (seen in FIG. 3) would be started, and valves 6 and 205 would be opened to connect blower 72 with a source of clean gas, advantageously clean atmospheric air, via pipe 5, panel bed 1, pipe 4, pipe 203, and pipe 204. Valve 202 would be opened to cause fly ash substantially smaller than 120 mesh, and preferably screened to remove particles larger than about 200 mesh, to pass from hopper 201 via pipe 203 into pipe 4 along with the clean gas and to be carried to gas entry faces 39 where the fly ash would accumulate is deposits. The velocity of the gas entering the deposits is preferably at least about 60 ft/min, and higher if convenient. A deposit would be allowed to accumulate until the pressure drop reaches about 0.3 to 0.5 cm/(ft/min), and the panel bed 1 would be cleaned and renewed by puffback as hereinbefore described. This cycle would be repeated at least about twice, for a total of three puffback cleanings, to condition the sand in panel bed 18, that is, to make it a bit dirty with fly ash so that succeeding fly ash deposits pud down better roots and are more coherent and have fewer pinholes. The three-increment procedure for producing a surface layer deposit for use in filtering the abovementioned micron-size particulate matter would then be put into effect. A first increment of fly ash would be put down, preferably at the aforementioned velocity of 60 ft/min or greater, until the pressure drop reaches about 0.05 cm/(ft/min). A second increment would be put down, again preferably at 60 ft/min or greater, until the pressure drop reaches at least about 0.15 cm/(ft/min), and preferably about 0.25 cm/(ft/min). Then a third increment would be put down, preferably at a velocity between about 8 and 12 ft/min, although satisfactory results are obtained at a velocity below 8 ft/min. The third increment should be at least about 1.5 times, and preferably 2 times, the pro rata portion of the second increment responsible for a pressure drop increase of about 0.1 cm/(ft/min). An even better, more coherent deposit will result if the third increment is approximately three times the aforementioned pro rata of the second increment, and if the velocity of the gas is increased for a few minutes to a velocity above 16 ft/min, while stopping the addition of fly ash to the gas, several times while the third increment is being put down. This has the effect of opening up the weaker spots, turning them into pinholes during the few minutes at high velocity, and then preferentially resealing them by further addition of fly ash to the deposits and thereby making the deposits more coherent.

After the desired deposit is put down, flow of gas from source 204 via valve 205 would be stopped, and valve 206 would be opened to commence treatment of the gas containing the radioactive or pathogenic or carcinogenic micron-size matter, with the expectation that this matter will be removed at an efficiency beyond about 99.99 per cent if the treating velocity is held between about 8 and 12 ft/min. A higher velocity may be used if a lower efficiency can be accepted.

Treatment would continue until the pressure drop across panel bed 1 builds up to too high a figure on account of accumulation of micron-size particles being filtered, or until quality tests on gas in line 73 reveal presence of unwanted amounts of the matter being filtered. In the latter instance, an attempt to restore the coherency of the surface layer deposits by putting down more fly ash at 8 to 12 ft/min may be efficacious. Puffback, however, can clean and renew the panel, and the cycle of operation can then be repeated.

METHOD FOR HIGH EFFICIENCY

We now give a method of operation of FIGS. 1, 2, and 3 for providing an efficiency that should adequately remove micron-size particulate matter for many purposes and uses that we anticipate, such as the removal of a fume from the combustion of a residual fuel oil or the removal of soot from the partial combustion of such an oil. The bed 18 would advantageously be charged with 20–30 mesh quartz sand, and preferably 20–60 mesh, while the bed 49 is suitably charged with 10–14 mesh sand. For some applications, it will be sufficient simply to put down surface layer deposits of fly ash at a high velocity, preferably 60 feet per minute or beyond, and to clean the deposits by puffback three times. For many applications, the gas to be treated by removal of the particulate matter may be used in putting down even the first three surface layer deposits on the sand freshly charged to bed 18. In these applications, one can accept the slippage of particulate matter during the putting down of the deposits, before they are fully made, as well as the poorer removal efficiency that is afforded by the first three deposits, which, as explained hereinbefore, will display more pinhole defects and will be less tough than the deposits formed later on after the first three puffback cleaning cycles are completed. In such a service, since the time between successive puffback cleanings can sometimes be relatively long, it will sometimes be advantageous to provide a tank 32 sufficiently large so that valve 6 need not be closed during the puffback. With a sufficiently large tank 32, the surge of gas from tank 32 would momentarily hold up the flow of the gas to be treated. If the gas to be treated also puts down the deposits, pipe 204 and valve 205 could be dispensed with, and the fly ash for the deposits could be introduced from valve 202 into pipe 4 with gas containing particulate matter flowing from valve 206.

Where a higher efficiency is desired, as is preferable if the abovementioned fume contains vanadium pentoxide, a substance believed to be injurious to human health, the three-increment procedure will be preferred for putting down the surface layer deposits, although the second increment and the third increment need not be as large as in the above-described procedure for ultra-high efficiency. If slippage of the micron-size particulate matter while the deposits are being put down is not desired, the gas for putting down the deposits can conveniently be provided in the form of gas already treated for removal of the matter by a panel bed with the precoat surface layer deposits of the invention.

METHOD FOR REINFORCING DEPOSITS BY RETICULATION:

Performance will be best if panel bed 1 is mounted so that it is completely free of vibrations that might crack open the surface deposits and spoil their coherency. If vibration-free mounting is not possible or convenient, or if frequent or sudden changes in flow rate are not conveniently avoided, it would be advantageous to provide for sufficient bonds between adjacent particles of the granular or fibrous medium to produce a reticulated network of particles in three dimensions. The bonds need not be very strong, but only just strong enough to provide the network with sufficient strength to resist spalling or cracking by vibrations of the type to be encountered or by typical expected change and rate of change in flow rate and the resulting change in pressure drop across the reticulated network deposit. For each anticipated situation, the strength and number of the bonds are best determined by adjustment to the specific operating conditions, it being within the expected skill of the operator to enhance reticulation if experience shows loss of coherency in operation and to continue adjusting the extent of reticulation until the minimum extent just necessary has been determined.

A suitable reticulating agent is a fine mist of a solution or suspension or emulsion of a sticky substance, preferably highly viscous and preferable also viscoelastic, in a liquid such as water. The particles of the fine medium would be passed through the mist, introduced into gas entry compartment 11 of panel bed 1 by several spray nozzles 213 (only one is shown in the cross-sectional view of the panel bed 1 in FIG. 1) supplied with the solution or suspension or emulsion from source 210 via valve 211 and pipe 212. The temperature relationship between the liquid and the gas flowing in gas inlet compartment 11 and their relative amounts should be such that the gas vaporizes the liquid and lays down deposits on surfaces 39 that are reticulated by the sticky substance.

Under various circumstances appropriate to the individual reticulating agents, tar or asphalt or pitch, glycerine, polyolefins (such as polybutadiene and polyisoprene), polyacrylics (such as polymethacrylate and ethylacrylate, including the cross-linked variety), polyacrylamides (including the cross-linked varieties), sodium silicate, and even common glues are suitable sticky substances for providing in a mist along with a light vaporizable suspending liquid. Polymerizable as well as polymerized materials may be used when they polymerize, preferably quickly, to form a sticky substance. Particularly convenient and useful are water solutions or suspensions or emulsions of epoxy materials, acrylic materials, or epoxy-acrylic mixtures.

Sometimes a preferred reticulating agent is an admixture of particles of a quick-setting cement, introduced along with fly ash into hopper 201 and intimately intermixed therewith. Especially quick-setting cement mixtures (see page 72 of the aforementioned book by Blanks and Kennedy) are known to those skilled in the art are usually scrupulously avoided because they are far too quick setting for normal cement and concrete practice, but these mixtures, which develop an initial set in a matter of seconds, are advantageous reticulating agents, reinforcing the fly ash deposits almost at once after they are put down. In order to supply the necessary water to set the cement, spray nozzles 213 may introduce a water mist into compartment 11, or the temperature and humidity of the gas carrying the fly ash and cement particles may be adjusted together with the temperature of sand in bed 18 so that a little moisture condenses as the gas enters the bed.

It will of course be understood that the reticulating agent is not to be added in such a large amount as to reduce appreciably the porosity of the surface layer deposits and thereby to impair their ability to treat gas.

Reinforcing the surface layer deposits of the invention by reticulation offers the broad advantage that higher flow rates may be used in substantially all applications of the invention, including the filtration of radioactive micron-size particulates if the deposits have been put down in accordance with the aforedescribed procedure for ultra-high efficiency of filtration. Higher flow rates may be used during filtration than when the deposits were laid down without risk of opening up pinholes if the granular or fibrous medium is reinforced by reticulation. Such higher flow rates are especially advantageous in the aforementioned application removing fume from combustion products of a residual fuel oil, where large volumes of gas are frequently encountered and gas-treating capacities are desirably large.

DISCUSSION OF THE PREFERRED GRANULAR OR FIBROUS MEDIA

We have experimented with two commercial grades of perlite filter aid commonly used to promote good filtration of liquids, one grade being 4.2 microns in diameter, and the other, about 15 microns in diameter. Penetrations through deposits of the perlites on 20–30 mesh sand at 10.9 feet per minute and at a pressure drop of 0.35 cm/(ft/min) were slightly lower than through deposits of fly ash at the same pressure drop, but at higher pressure drops the perlite deposits did not appear capable of affording penetrations as small as deposits of fly ash on 20–30 mesh sand could provide. The perlite deposits had the disadvantage that they were physically thicker than the fly ash deposits at the same pressure drop. For example, at about 0.35 cm/(ft/min), a perlite deposit would be about 30 millimeters thick, in contrast to the 10 millimeter thickness of a fly ash deposit.

We have experiemtned with teflon powder, a material of low cohesivity toward itself, sometimes termed autohesivity. This powder produced such poor surface layer deposits, having so little power to remove 1.1 micron particles from a gas flow, that we came to appreciate that the surface layer deposits should be formed of media have good autohesivity. Fly ash and perlite and conventional clay filter aids commonly used in liquid filtration practice and fibers such as asbestos, also commonly used as a filter aid in liquid filtration, all have good autohesivity. Cement powder has good autohesivity, and would be a preferred medium for the surface layer deposits. Since the autohesivity of cement is appreciably greater than that of fly ash, the cement could preferably be put down at even higher velocities in the first and second increments of the three-increment method. Cement powder would also have the advantage of having in itself the capability of providing reticulation, i.e., a power for autoreticulation, that could make cement powder the medium of choice for some applications where the moisture content of the deposits can be kept under control.

The granular or fibrous medium of the precoat surface layer deposits should also have good adhesion toward the granular material of the panel bed 18. A good discussion of adhesion forces is to be found in Anatolii D. Zimon, Adhesion of Dust and Powder, translated from the Russion, Morton Corn, translation editor, Plenum Press, New York, 1969. See especially the discussion of autohesion on page 309 and the following pages. It may be remarked that at normal temperature and temperatures a little above normal, most materials exhibit stronger adhesive and autohesive forces in gas of high humidity than of low. This fact will tend to improve the performance of the instant invention at such temperatures in humid gases, an important advantage for the application of ridding the atmosphere of a uranium mine of dust bearing radon daughters. Many dusts become more autohesive if wet, including fly ash, magnesite dust, and blast-furnace slag dust. Cement becomes strongly autohesive when wet. Other strongly autohesive dusts are gypsum and alabaster dusts, flour, and dust from fibrous materials. Shale dust and limestone dust are more autohesive than most random fine rock. We refer to the aforementioned copending application number 10 for procedures and apparatus for wetting surface layer deposits on a panel bed, and these are sometimes also advantageously employed to wet the deposits of the method of the instant invention.

We believe that good adhesion to the granular material and good autohesion are both properties of benefit in producing a surface layer deposit of the invention with few pinhole defects and good roots penetrating into the bed of the granular material and conferring toughness upon the deposit.

MOVING GAS ENTRY FACES A BIT OUT OF PERFECT CONTIGUITY WITH EDGES OF SUPPORT MEMBERS

Sometimes a gas must be treated in a situation where the pressure drop in the gas must be kept as low as possible. In such a situation, one would prefer to use a sand in bed 18 considerably coarser than 20 mesh, such as 10–14 mesh. A fibrous medium such as asbestos fibers would then be advantageous for use in the surface layer deposits, but a fibrous medium will tend to form deposits of thicknesses comparable to those cited herinbefore for perlite. This raises the danger that the deposits will spall from the gas entry faces 39 during gas treatment. In this circumstance, the alternative gas-entry-portion supporting member design 413 of FIG. 4 is particularly advantageous.

Member 413 has an upper surface running from its outer edge 40 to its inner edge 42. The member has a lower surface running from its outer edge 41 to its inner edge 42, common to the inner edge 42 of the upper surface, the two surfaces being articulated in an edge joint at their inner edges. Outer edge 41 of the lower surface of a given member cooperates with outer edge 40 of the next subjacent member to retain and support a gas entry portion 61 of bed 18. The gas entry portion 61 has a gas entry face 39, shown to be in substantially perfect contiguity with edges 40 and 41 in the drawing of FIG. 4. Notice that a line drawn through edge 41 of a given member and edge 40 of the subjacent member is at an angle less than about 25°.

In operation of the modified panel bed 1 with the members 413 of FIG. 4, the gas entry faces 39 are advantageously placed a small distance out of perfect contiguity with edges 40 and 41 by causing a sudden surge flow of gas forward and inward through the faces 39. Such a sudden rush of gas into faces 39 can be conveniently created by opening valve 6, with valves 202, 205, and 206 remaining closed, and by then opening valve 402 for a brief interval of time, such as a few seconds, to allow gas to flow in a surge flow from a source 401 of gas at a high pressure, such as 60 pounds per square inch gauge, forwardly into panel bed 1. The effect of such a surge flow is often to spall granular material from gas entry faces 39 and to move the faces inward by a body movement that is accompanied by a reduction in the porosity of bed 18. The distance that gas entry faces 39 move inward is a function of the size of the granular material of bed 18, the intensity of the surge, and the porosity of bed 18 just before the inward surge of gas (this last variable, in a repeated cyclic operation with repeated puffback cleanings, being a function of the intensity of the puffback regularly employed). It is preferable and usually practicable to move gas entry faces 39 inward by a distance between about one- to three-sixteenths inch. For the practical effect of a subsequent puffback cleaning and renewal of gas entry faces 39, the faces remain substantially contiguous with edges 40 and 41, although not in perfect contiguity, after their inward displacement by such a small distance. That is to say, puffback cleaning may readily be moderated to overcome such a small displacement, the body movement of bed 18 advancing the gas entry faces 39 easily through this distance and then further to produce the desired spill of material from the faces, thereby cleaning and renewing the faces.

After the gas entry faces 39 have been moved inward by the abovedescribed small distance, surface layer deposits of the granular or fibrous medium can be put down, preferably by the threeincrement method hereinbefore described. The deposits, especially thick deposits of fibrous media, are more protected from spalling by vibrations or other disturbances when they are used in the arrangement of FIG. 4 and the abovedescribed procedure for its operation.

The inwardly displaced deposits just described in connection with FIG. 4 are advantageously reticulated for greater coherency and to permit the treatment of a gas by the deposits at higher gas velocities.

It should be noted that the porosity of granular material bed 18 should be brought initially to the uniform porosity appropriate for the puffback intensity selected for operation, as discussed more fully in the aforementioned application number 1, "Treating Gas and Granular Material in Panel Bed."Specifically, it is advantageous to subject the panel bed initially to a "strong" puffback at an intensity exceeding that contemplated for subsequent operations, or to discharge a controlled quantity of granular material from the bottom of panel bed 18.

We do not wish our invention to be limited to the particular embodiments illustrated in the drawings and described above in detail. Other arrangements will be recognized by study of the aforementioned co-pending applications and by those skilled in the art, as well as purposes other than those discussed herein which the invention can advantageously serve.

We claim:

1. The method of treating a gas including the separation and removal of micron-size particulate matter by means of a filter of granular material which comprises:
   a. arranging granular material smaller than about 40 mesh in a panel bed having a plurality of transversely disposed upwardly spaced gas entry portions separated by interposed supporting members having outer and inner edges with respect to the bed wherein said gas entry portions have gas entry faces substantially contiguous with said outer edges and wherein said bed has gas exit portions spaced from said inner edges;
   b. forwardly flowing gas through the gas entry portions of the granular material bed and outwardly from the gas exit portions while adding to said gas a first increment of a element selected from the group consisting of granular of fibrous medium substantially smaller than about 120 mesh to separate and accumulate said medium in surface layer deposits at said gas entry faces wherein said gas enters said gas entry faces at a velocity greater than about 16 feet per minute during at least a part of this step (b);
   c. stopping the forward flow of said gas of step (b);
   d. causing a transient flow of gas to move in the direction in reverse to the flow of said gas in (b);
   e. said transient reverse flow producing first a rise at a given rate of rise and subsequently a fall in the pressure difference between said gas exit portions and said gas entry portions, said difference remaining greater than a first critical minimum difference for a time interval less than about 50 milliseconds, said first critical difference being that difference at which a steady flow of gas in said reverse direction just produces a localized spill of said granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of said granular material toward said gas entry faces to spill a portion of the granular material and substantially all of said accumulated granular or fibrous medium and said accumulated micron-size particulate matter from the bed;
   f. supplying fresh granular material to replace material spilled from gas entry portions;
   g. repeating the cycle of said steps (b), (c), (d), (e) and (f) at least two times;
   h. forwardly flowing gas through the gas entry portions of the granular material bed and outwardly from the gas exit portions while adding to said gas a first increment of said granular or fibrous medium at a rate of addition less than about 5 grams per cubic meter of said gas to separate and accumulate said medium in surface layer deposits at said gas entry faces wherein said gas first enters said gas entry faces at a first velocity greater than about 16 feet per minute until the pressure drop across said surface layer deposits reaches about 0.05 centimeters of water per foot per minute of said first velocity and then adding to said gas a second increment of said medium at a rate of addition less than about 5 grams per cubic meter of said gas while the gas enters said gas entry faces at a second velocity greater than about 16 feet per minute until said pressure drop increases by at least about 0.1 centimeters of water per foot per minute of said second velocity and wherein subsequently the rate of flow of said gas is reduced so that the gas enters said gas entry faces at a third velocity less than about one-half of said first velocity and of said second velocity and also less than about 16 feet per minute while adding to said gas at a rate of addition less than about 5 grams per cubic meter of said gas a third increment of said medium wherein said third increment is at least about 1.5 times as large as said second increment when said pressure drop increased with the addition of said second increment by about 0.1 centimeters of water per foot per minute and wherein, when said pressure drop increased by a substantially greater amount, said third increment is at least about 1.5 times as large as the pro rata portion of said second increment that was responsible for an increase of exactly 0.1 centimeter of water per foot per minute;
   i. stopping the forward flow of said gas of step (h) and forwardly flowing gas to be treated at a rate to enter said gas entry faces at a velocity not substantially greater than said third velocity and thereby treating said gas by contact with said surface layer deposits and thereby to separate and accumulate said micron-size particulate matter on said surface layer deposits of said granular or fibrous medium;
   j. stopping the forward flow of said gas of step (i); and
   k. repeating steps (d), (e), (f), (h), (i) and (j) in a cyclic manner.

2. The method of claim 1 wherein said first velocity of step (h) is greater than about 60 feet per minute and wherein said second velocity of step (h) is greater than about 30 feet per minute.

3. The method of claim 1 wherein said third increment of step (h) is at least about 2 times as large as said second increment when said pressure drop increased with the addition of said second increment by about 0.1 centimeters of water per foot per minute of said second velocity and wherein, when said pressure drop increased by a substantially greater amount, said third increment is at least about 2 times as large as the pro rata portion of said second increment that was responsible for an increase of exactly 0.1 centimeters of water per foot per minute.

4. The method of claim 1 wherein said third increment of step (h) is added in several sub-increments and wherein the velocity of said gas in step (h) is increased from said third velocity to at least substantially said first velocity and held at said higher velocity for several minutes and then returned to said third velocity between each addition of a sub-increment.

5. The method of claim 1 in which said granular medium is fly ash from the combustion of pulverized coal.

6. The method of claim 1 in which said granular or fibrous medium is smaller than about 200 mesh.

7. The method of claim 1 in which said micron-size particulate matter includes dust particles bearing radioactive daughters of radon.

8. The method of claim 1 in which said micron-size particulate matter includes radioactive particles of sodium oxide.

9. The method of claim 1 in which said gas to be treated is air and wherein said micron-size particulate matter includes pathogenic or carcinogenic matter.

10. The method of treating a gas including the separation and removal of micron-size particulate matter by means of a filter of granular material which comprises:
   a. arranging granular material in a panel bed having a plurality of transversely disposed upwardly spaced gas entry portions separated by interposed supporting members having outer and inner edges with respect to the bed wherein said gas entry portions have gas entry faces substantially contiguous with said outer edges and wherein said bed has gas exit portions spaced from said inner edges;
   b. forwardly flowing gas through the gas entry portions of the granular material bed and outwardly from the gas exit portions while adding to said gas a element selected from the group consisting of granular or fibrous medium substantially smaller than about 120 mesh to separate and accumulate said medium in surface layer deposits at said gas entry faces wherein said gas enters said gas entry faces at a velocity greater than about 16 feet per minute during at least a part of this step (b);
   c. thereafter causing a transient flow of gas to move in the direction in reverse to the flow of said gas in (b);
   d. said transient reverse flow producing first a rise at a given rate of rise and subsequently a fall in the pressure difference between said gas exit portions and said gas entry portions, said difference remaining greater than a first critical minimum difference for a time interval less than about 150 milliseconds, said first critical difference being that difference at which a steady flow of gas in said reverse direction just produces a localized spill of said granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of said granular material toward said gas entry faces to spill a portion of the granular material from the bed;
   e. supplying fresh granular material to replace material spilled from said gas entry portions;
   f. repeating the cycle of said steps (b), (c), (d), and (e) at least two times and then repeating step (b);
   g. forwardly flowing gas to be treated through the gas entry portions of the granular material bed and outwardly from the gas exit portions to treat said gas by contact with said surface layer deposits and thereby to separate and accumulate micron-size particulate matter on said surface layer deposits of said granular or fibrous medium and wherein either at least a first part of this step (g) occurs simultaneously with a said step (b), the gas in (b) comprising the gas to be treated, or this step (g) is wholly subsequent to said step (b); and
   h. thereafter repeating steps (c) (d), (e), (b), and (g) in a cyclic manner.

11. The method of claim 10 wherein said gas of step (b) enters said gas entry faces at a velocity greater than about 30 feet per minute to accumulate a first portion of said deposits and wherein subsequently said gas of step (b) enters said gas entry faces at a second velocity below about 16 feet per minute to accumulate a second portion of the deposits and to substantially close up pinholes present in said first portion.

12. The method of claim 10 wherein said time interval is less than about 150 milliseconds.

13. The method of claim 10 wherein said granular medium is fly ash from the combustion of pulverized coal and said granular material of said panel bed is smaller than about 20 mesh.

14. The method of claim 10 wherein the gas to be treated is the product of combustion of a heavy fuel oil.

15. The method of claim 10 wherein the gas to be treated is the product of the partial combustion of a heavy fuel oil.

16. The method of claim 10 wherein the rate of addition of said granular or fibrous medium to said gas of said step (b) is less than about 10 grams per cubic meter of said gas and wherein said gas first enters said gas entry faces at a first velocity greater than about 16 feet per minute while there is added to the gas a first increment of said medium until the pressure drop across said surface layer deposits reaches about 0.05 centimeters of water per foot per minute of said first velocity and wherein said gas next enters said gas entry faces at a second velocity greater than about 16 feet per minute while there is added to said gas a second increment of said medium until said pressure drop increases by at least about 0.08 centimeters of water per foot per minute of said second velocity and wherein subsequently the rate of flow of said gas is reduced so that the gas enters said gas entry faces at a third velocity less than about one-half of said first velocity and of said second velocity and also less than about 16 feet per minute while there is added to said gas a third increment of said medium wherein said third increment is at least about 1 times as large as said second increment when said pressure drop increased with the addition of said second increment by about 0.08 centimeters of water per foot per minute and wherein, when said pressure drop increased by a substantially greater amount, said third increment is at least about 1 times as large as the pro rata portion of said second increment that was responsible for an increase of exactly 0.08 centimeters of water per foot per minute.

17. The method of claim 16 wherein said first velocity of said step (b) is greater than about 60 feet per minute and wherein said second velocity of step (b) is greater than about 30 feet per minute.

18. The method of claim 16 wherein said third increment of step (b) is at least about 1.5 times as large as said second increment when said pressure drop increased with the addition of said second increment by about 0.08 centimeters of water per foot per minute of said second velocity and wherein, when said pressure drop increased by a substantially greater amount, said third increment is at least about 1.5 times as large as the pro rata portion of said second increment that was responsible for an increase of exactly 0.08 centimeters of water per foot per minute.

19. The method of claim 16 wherein said third increment of step (b) is added in several sub-increments and wherein the velocity of said gas in step (b) is increased from said third velocity to at least substantially said first velocity and held at said higher velocity for several minutes and then returned to said third velocity between each addition of a sub-increment.

20. A method of making coherent reinforced surface layer deposits for coordinately reinforcing the surface layer deposits and improving efficiency of filtration using such deposits in a renewable panel bed filter method for treating a gas including the separation and removal of micron-size particulate material, comprising:

a. arranging a granular material in a panel bed having a plurality of transversely disposed upwardly spaced gas entry portions separated by interposed supporting members having outer and inner edges with respect to the bed wherein said gas entry portions have gas entry faces substantially contiguous with said outer edges and wherein said bed has gas exit portions spaced from said inner edges;

b. forwardly flowing gas through the gas entry portions of the granular material bed and outwardly from the gas exit portions while adding to said gas element selected from the group consisting of granular or fibrous medium substantially smaller than about 120 mesh admixed with a reticulating agent to separate and accumulate said medium and reticulating agent in surface layer deposits at said gas entry faces wherein said gas enters said gas entry faces at a velocity greater than about 16 feet per minute during at least a part of this step (b) and wherein said reticulating agent establishes bonds between adjacent particules of said granular or fibrous medium at at least a fraction of the points of contact among particles of said medium to provide a reticular network of said particles thereby reinforcing said surface layer deposits and rendering the deposits less vulnerable to spalling or cracking under influence of vibrations or sudden change in pressure difference across the deposits on account of sudden change in gas flow;

c. thereafter causing a transient flow of gas to move in the direction in reverse to the flow of said gas in (b);

d. said transient reverse flow producing first a rise at a given rate of rise and subsequently a fall in the pressure difference between said gas exit portions and said gas entry portions, said difference remaining greater than a first critical minimum difference for a time interval less than about 150 milliseconds, said first critical difference being that difference at which a steady flow of gas in said reverse direction just produces a localized spill of said granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of said granular material toward said gas entry faces to spill a portion of the granular material and substantially all of said accumulated granular or fibrous medium in said reinforced surface layer deposits from the bed;

e. supplying fresh granular material to replace material spilled from said gas entry portions;

f. repeating the cycle of said steps (b), (c), (d) and (e) at least two times and then repeating step (b);

g. forwardly flowing gas to be treated through the gas entry portions of the granular material bed and outwardly from the gas exit portions to treat said gas by contact with said reinforced surface layer deposits of said granular or fibrous medium and thereby to separate and accumulate micron-size particulate matter on said surface layer deposits and wherein either at least a first part of the step (g) occurs simultaneously with a said step (b), the gas in (b) comprising the gas to be treated, or this step (g) is wholly subsequent to said step (b); and h. thereafter repeating steps (c), (d), (e), (b) and (g) in a cyclic manner.

21. The method of claim 20 wherein said gas of step (b) enters said gas entry faces at a velocity greater than about 30 feet per minute to accumulate a first portion of said deposits and wherein subsequently said gas of step (b) enters said gas entry faces at a second velocity below about 16 feet per minute to accumulate a second portion of the deposits and to substantially close up pinholes present in said first portion.

22. The method of claim 20 wherein said time interval is less than about 50 milliseconds.

23. The method of claim 20 wherein said granular medium is fly ash from the combustion of pulverized coal and said granular material of said panel bed is smaller than about 20 mesh.

24. The method of claim 20 in which said reticulating agent is a cementitious material and wherein water is provided to wet said surface layer deposits.

25. The method of claim 20 in which said reticulating agent is a quick-setting cement and wherein water is provided to wet said surface layer deposits.

26. The method of claim 20 in which said reticulating agent is a solution of sodium silicate in water.

27. The method of claim 20 in which said reticulating agent is a mist of droplets of a solution or suspension or emulsion of a sticky substance in water.

28. The method of claim 20 wherein the rate of addition of said granular or fibrous medium admixed with said reticulating agent to said gas of said step (b) is less than about 10 grams per cubic meter of said gas and wherein said gas first enters said gas entry faces at a first velocity greater than about 16 feet per minute while there is added to the gas a first increment of said medium admixed with said reticulating agent until the pressure drop across said surface layer deposits reaches about 0.05 centimeters of water per foot per minute of said first velocity and wherein said gas next enters said gas entry faces at a second velocity greater than about 16 feet per minute while there is added to said gas a second increment of said medium admixed with a reticulating agnet until said pressure drop increases by at least about 0.08 centimeters of water per foot per minute of said second velocity and wherein subsequently the rate of flow of said gas is reduced so that the gas enters said gas entry faces at a third velocity less than about one-half of said first velocity and of said second velocity and also less than about 16 feet per minute while there is added to said gas a third increment of said medium admixed with said reticulating agent wherein said third increment is at least about 1 times as large as said second increment when said pressure drop increased with the addition of said second increment by about 0.08 centimeters of water per foot per minute and wherein, when said pressure drop increased by a substantially greater amount, said third increment is at least about 1 times as large as the pro rata portion of said second increment that was responsible for an increase of exactly 0.08 centimeters of water per foot per minute.

29. The method of claim 28 wherein said first velocity of said step (b) is greater than about 60 feet per minute and wherein said second velocity of step (b) is greater than about 30 feet per minute.

30. The method of claim 28 wherein said third increment of step (b) is added in several sub-increments and wherein the velocity of said gas in step (b) is increased from said third velocity to at least substantially said first velocity and held at said higher velocity for several minutes and then returned to said third velocity between each addition of a sub-increment.

31. The method of claim 30 wherein
the rate of addition of said granular or fibrous medium in step (b) is less than about 5 grams per cubic meter of said gas in (b);
said granular material is smaller than about 40 mesh;
said third increment is at least about 2 times as large as said second increment when said pressure drop increased with the addition of said second increment by about 0.08 centimeters of water per foot per minute and wherein, when said pressure drop increased by a substantially greater amount, said third increment is at least about 2 times as large as the pro rata portion of said second increment that was responsible for an increase of exactly 0.08 centimeters of water per foot per minute;
said step (g) is wholly subsequent to said step (b);
the forward flow of said gas to be treated in step (g) is stopped prior to the following step (c); and
said micron-size particulate matter is a contaminant selected from the group consisting of radioactive or pathogenic or carcinogenic.

32. The method of claim 20 in which said reticulating agent is a mist of droplets of a solution or suspension or emulsion of an asphalt or pitch in a liquid and wherein said liquid subsequently vaporizes from said surface layer deposits.

33. The method of claim 20 in which said reticulating agent is a mist of droplets of a solution or suspension of a polymerized or polymerizable substance or mixture of substances in a liquid and wherein said liquid subsequently vaporizes from said surface layer deposits.

34. The method of claim 33 in which said liquid is water and said polymerized or polymerizable substance or mixture of substances consists of epoxy materials, acrylic materials, or epoxy-acrylic mixtures.

35. A method for making coherent reinforced surface layer deposits of fly ash from combustion of pulverized coal on a renewable panel bed of a granular material for treating a gas including the separation and removal of micron-size particulate matter, comprising:
 a. arranging granular material smaller than about 20 mesh in a panel bed having a plurality of transversely disposed upwardly spaced gas entry portions separated by interposed supporting members having outer and inner edges with respect to the bed wherein said gas entry portions have gas entry faces substantially contiguous with said outer edges and wherein said bed has gas exit portions spaced from said inner edges; and
 b. forwardly flowing gas through the gas entry portions of the granular material bed and outwardly from the gas exit portions while adding to said gas a fly ash from the combustion of pulverized coal wherein the fly ash is substantially smaller than about 120 mesh and is admixed with a reticulating agent and wherein said fly ash admixed with said reticulating agent separates and accumulates in surface layer deposits at said gas entry faces and wherein said gas enters said gas entry faces during at least a part of this step (b) at a velocity greater than about 16 feet per minute and wherein said reticulating agent establishes bonds between adjacent particles of said fly ash at at least a fraction of the points of contact among said particles of said fly ash to provide a reticular network of said particles and rendering the deposits less vulnerable to spalling or cracking under influence of vibrations or sudden change in pressure difference across the deposits on account of sudden change in gas flow;
 c. thereafter causing a transient flow of gas to move in the direction in reverse to the flow of said gas in (b);
 d. said transient reverse flow producing first a rise at a given rate of rise and subsequently a fall in the pressure difference between said gas exit portions and said gas entry portions, said difference remaining greater than a first critical minimum difference for a time interval less than about 50 milliseconds, said first critical difference being that difference at which a steady flow of gas in said reverse direction just produces a localized spill of said granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of said granular material toward said gas entry faces to spill a portion of the granular material and said reinforced surface layer deposits from the bed;
 e. supplying fresh granular material to replace material spilled from said gas entry portions; and
 f. repeating the cycle of said steps (b), (c), (d), and (e) at least two times and then repeating step (b) to make coherent reinforced surface layer deposits of fly ash.

36. The method of claim 35 wherein said gas of step (b) enters said gas entry faces at a velocity greater than about 30 feet per minute to accumulate a first portion of said deposits and wherein subsequently said gas of step (b) enters said gas entry faces at a second velocity below about 16 feet per minute to accumulate a second portion of the deposits and to substantially close up pinholes present in said first portion.

37. The method of claim 35 wherein said reticulating agent is a quick-setting cement and wherein water is provided to wet said surface layer deposits.

38. The method of claim 35 wherein said reticulating agent is a mist of droplets of a solution or suspension or emulsion of a sticky substance or material polymerizable to a sticky substance in a liquid and wherein said liquid subsequently vaporizes from said surface layer deposits.

39. The method of treating a gas including the separation and removal of micron-size particulate matter by means of a filter of granular material which comprises a. arranging granular material in a panel bed having a plurality of transversely disposed upwardly spaced gas entry portions separated by interposed supporting members, a typical said member having an upper and a lower surface each having outer and inner edges with respect to the bed wherein said surfaces are articulated at an edge joint at their respective inner edges and wherein each of said surfaces is gently curved and inclines downwardly and inwardly from its outer edge and then upwardly and inwardly toward said edge joint and wherein said upper surface of a given member and the said lower surface of the next superjacent member cooperate to support and retain a said gas entry portion having gas entry face substantially contiguous but not in perfect contiguity with said outer edges of said surfaces, and wherein said bed has gas exit portions spaced from the inner edge joints of said members;

b. forwardly flowing gas through the gas entry portions of the granular material bed and outwardly from the gas exit portions while adding to said gas a element selected from the group consisting of granular or fibrous medium substantially smaller than about 120 mesh to separate and accumulate said medium in surface layer deposits at said gas entry faces wherein said gas enters said gas entry faces at a velocity greater than about 16 feet per minute during at least a part of this step (b);

c. thereafter causing a transient flow of gas to move in the direction in reverse to the flow of said gas in (b);

d. said transient reverse flow producing first a rise at a given rate of rise and subsequently a fall in the pressure portions, said difference remaining greater than a first critical minimum difference for a time interval less than about 150 milliseconds, said first critical difference being that difference at which a steady flow of gas in said reverse direction just produces a localized spill of said granular material from said gas entry faces, and said difference produced by said transient reverse flow peaking to a top value beyond a second critrical minimum difference, which is the pressure difference at which a transient flow of gas in said reverse direction producing said pressure difference at said rate of rise just initiates a body movement of said granular material toward said gas entry faces to bring said faces into perfect contiguity with said outer edges of said upper and lower surfaces and to spill a portion of the granular material and substantially all of said accumulated granular or fibrous medium from the bed;

e. supplying fresh granular material to replace material spilled from said gas entry portions;

f. causing a gas to flow suddenly forwardly through the gas entry portions of the granular material bed to cause a body movement of said gas entry portions inwardly coordinately with a decrease in the porosity of said bed and thereby to move said gas entry faces a short distance away from perfect contiguity with said outer edges of said upper and lower surfaces of said members;

g. repeating the cycle of said steps (b), (c), (d), (e), and (f) at least two times and then repeating step (b);

h. forwardly flowing gas to be treated through the gas entry portions of the granular material bed and outwardly from the gas exit portions to separate and accumulate micron-size particulate matter on said surface layer deposits of said granular or fibrous medium and wherein either at least a first part of this step (h) occurs simultaneously with a said step (b), the gas in (b) comprising the gas to be treated, to this step (h) being wholly subsequent to said step (b); and i. thereafter repeating steps (c) (d), (e), (f), (b), and (h) in a cyclic manner.

40. The method of claim 39 in which said granular or fibrous medium of step (b) is admixed with a reticulating agent and wherein said reticulating agent establishes bonds between adjacent particles of said medium at at least a fraction of the points of contact among particles of said medium to provide a reticular network of said particles thereby reinforcing said surface layer deposits and rendering the deposits less vulnerable to spalling or cracking under influence of vibrations or sudden change in pressure difference across the deposits on account of sudden change in flow.

41. The method of claim 39 wherein said medium is fibrous and said granular material of said panel bed is larger than about 20 mesh.

42. The method of claim 39 wherein said gas of step (b) enters said gas entry faces at a velocity greater than about 30 feet per minute to accumulate a first portion of said deposits and wherein subsequently said gas of step (b) enters said gas entry faces at a second velocity below about 16 feet per minute to accumulate a second portion of the deposits and to substantially close up pinholes present in said first portion.

43. The method of claim 42 wherein said granular medium is fly ash from the combustion of pulverized coal and wherein said granular material of said panel bed is smaller than about 20 mesh.

* * * * *